United States Patent
Rothstein et al.

[11] 3,886,762
[45] June 3, 1975

[54] APPARATUSES FOR FREEZING ARTICLES OF FOOD AND SIMILAR PRODUCTS

[75] Inventors: Sven-Olle H. Rothstein; Sture Åström, both of Helsingborg, Sweden

[73] Assignee: Frigoscandia Contracting AB, Helsingborg, Sweden

[22] Filed: Aug. 28, 1973

[21] Appl. No.: 392,217

[30] Foreign Application Priority Data
Sept. 15, 1972 Sweden............................ 11910/72

[52] U.S. Cl. ....................... 62/380; 62/57; 34/57 A
[51] Int. Cl. ............................................. F25d 25/04
[58] Field of Search ........... 34/57 A; 62/57, 63, 380

[56] References Cited
UNITED STATES PATENTS
3,169,381  2/1965  Perrson .................................. 62/57
3,492,740  2/1970  Geipel et al. ...................... 34/57 A Primary Examiner—Meyer Perlin
Assistant Examiner—Ronald C. Capossela
Attorney, Agent, or Firm—Karl W. Flocks

[57] ABSTRACT

Apparatus for freezing articles of food and similar products, comprising between side walls a perforated conveyor feeding the product through a freezing chamber, and at least one device, delimited to a small part of the length of said conveyor, for directing a gaseous refrigerant up through the conveyor in order to set the product in motion during freezing. Said device comprises a perforated bottom mounted immediately underneath said conveyor and permitting a controlled fluidized bed to be maintained above it, the space allowed for said fluidized bed being defined by the side walls and the product on the conveyor before and after the location of the perforated bottom.

5 Claims, 3 Drawing Figures

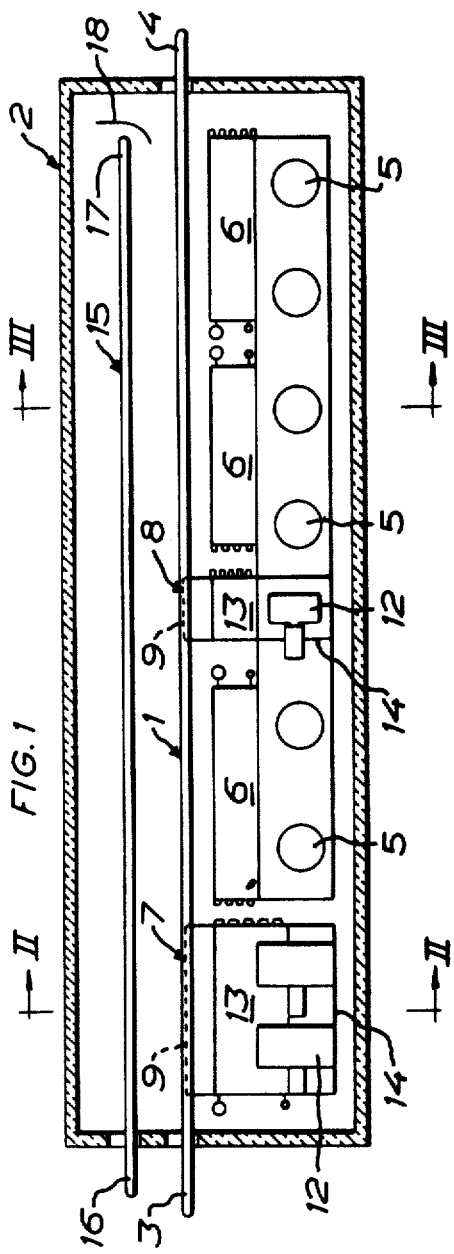
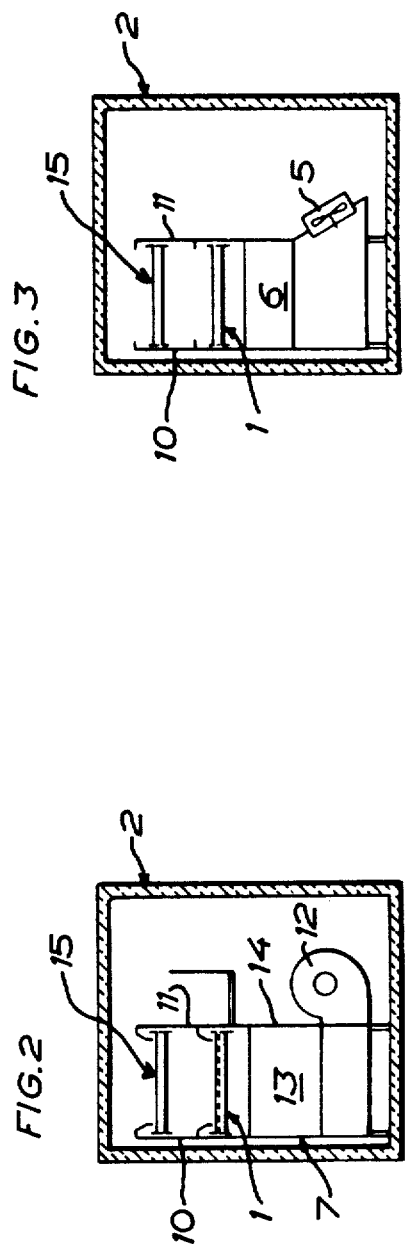

APPARATUSES FOR FREEZING ARTICLES OF FOOD AND SIMILAR PRODUCTS

The present invention relates to an apparatus for freezing articles of food and similar products. The apparatus has between side walls a perforated conveyor feeding the product through a freezing chamber and at least one device, delimited to a small part of the length of said conveyor, for directing a gaseous refrigerant up through the conveyor in order to set the product in motion during freezing. According to the invention, said device comprises a perforated bottom mounted immediately underneath said conveyor and permitting a controlled fluidized bed to be maintained above it, the space allowed for said fluidized bed being defined by the side walls and the product on the conveyor before and after the location of the perforated bottom. Only by this invention has it become possible to use a belt type freezing tunnel as a fluidized conveyor apparatus, since prior art apparatuses for directing gaseous refrigerant up through the conveyor, have only permitted stirring of the product during freezing. Thus, by simple means, the present invention has made it possible to create a universal freezer, in which fluidizable as well as non-fluidizable products can be frozen. It also is of importance that a per se fluidizable product can be frozen without fluidization by means of said conveyor, this freezing method being applied when for economical reasons the available product mass does not justify fluidization.

A preferred embodiment of the invention will be more fully described hereinbelow with reference to the accompanying drawing, in which:

FIG. 1 is a longitudinal sectional view of the apparatus; and

FIGS. 2 and 3 are sectional views thereof along lines II–II and III–III, respectively, in FIG. 1.

The apparatus comprises a perforated endless conveyor 1 designed to feed through the freezing changer 2 the food product or the like to be frozen. The end portions 3, 4 of the conveyor 1 reach outside the freezing changer 2, one end portion 3 being intended for loading of the product and the other end portion 4 for unloading of the product. The freezing chamber 2 is provided with fans 5 for the cooling air or gas intended to pass the cooling-coil batteries 6.

According to the shown embodiment, the apparatus is provided with two devices 7 and 8, delimited to a small part of the length of the conveyor 1, for directing a gaseous refrigerant up through the conveyor 1 in order to set the product in motion during freezing. The devices 7 and 8 comprise a perforated bottom 9 mounted immediately underneath the conveyor 1 and permitting a controlled fluidized bed to be maintained above it. The space allowed for said fluidized bed is defined by the product on the conveyor 1, before and after the location of the perforated bottom 9, and by side walls 10 and 11 extending along the conveyor. Thus, as there are no particular end walls in the devices 7 and 8, the conveyor 1 can easily be used for common transportation of products through the freezing chamber 2.

The two devices 7 and 8 directing a gaseous refrigerant up through the conveyor 1 comprise specific pressure chambers 14 provided with fan means 12 and cooling means 13 and including the perforated bottom 9 in a section located below the conveyor 1.

For the controlled fluidized bed it is normally required that the perforations of the perforated bottom 9 be irregularly distributed. As a result thereof, the perforated conveyor 1 cannot serve as bottom for the fluidized bed. Also, it is not economical to form the conveyor 1 as a bottom for the bed, since the perforations for throttling must not cover more than 15–25% of the area. The perforations in a conveyor generally cover over 70% of the area of the conveyor.

The first device 7, as counted in the feed direction, is intended for surface freezing of the product, so that a thick product bed on said conveyor 1 can be maintained after said device 7 without any risk of the particular products freezing together or freezing on the conveyor. The second device 8 is intended to make the product change position on the conveyor in order to obtain a maximum heat transfer in the product bed. After leaving said device 7, the product is lying as a thick bed on the conveyor which passes it on towards said device 8. During the conveyance the product mass is further cooled, but owing to the direction of the current of air, the lower part of the product mass is being more cooled than the central and upper parts. By the fluidization at said device 8, the particles of the product mass are mixed up and levelled, which makes the apparatus more efficient.

Above the conveyor 1 feeding the product through the freezing chamber 2, the apparatus has a second endless, preferably perforated conveyor 15 one end portion 16 of which reaches outside said freezing chamber 2. The other end portion 17 inside the freezing chamber 2 cooperates with a guiding means 18 for transferring the product from the conveyor 15 to the conveyor 1.

The conveyor 15 is primarily designed for freezing non-fluidizable products and in that case it is used in combination with the lower conveyor 1. The product is fed onto the upper conveyor 15 and transferred by the guiding means 18 onto the lower conveyor 1 which has been reversed so that the product is discharged on the same side as it was fed.

The conveyor 15 can also be used when wet fluidizable products are being frozen on the lower conveyor 1. Then the moist air above the fluidizing part is allowed to deposit as frost on said conveyor 15, thereby unloading the battery, so that a longer production time is obtained between the defrosting operations. The conveyor 15 may suitable be advanced pulsatingly or be driven at a very slow speed so that the whole surface of the conveyor will be utilized for frost formation.

As appears from FIGS. 2 and 3, the side walls 10 and 11 extend between the conveyors 1 and 15 so as to form a closed box-shaped space between said conveyors. This eliminates the risk of the product being blown away from the conveyor 1.

As the apparatus according to the invention permits freezing products with or without fluidization, the air can always be given the velocity motivated from an economical point of view.

In connection with the fluidization, the product bed on the conveyor 1 can be about 100–200 mm thick without the products freezing together after the fluidizing device 7.

The present invention is not restricted to what has been described above and shown in the drawing, but may be modified within the compass of the following claims.

What we claim and desire to secure by Letters Patent is:

1. Apparatus for freezing articles of food and similar products, comprising between side walls a perforated conveyor feeding the product through a freezing chamber, and at least one device, delimited to a small part of the length of said conveyor, for directing a gaseous refrigerant up through the conveyor in order to set the product in motion during freezing, wherein said device comprises a perforated bottom mounted immediately underneath said conveyor and permitting a controlled fluidized bed to be maintained above it, the space allowed for said fluidized bed being defined by the side walls and the product on the conveyor before and after the location of the perforated bottom.

2. apparatus as claimed in claim 1, wherein the device for directing a gaseous refrigerant up through the conveyor comprises a specific pressure chamber provided with fan and cooling means and including the perforated bottom in a section located below the conveyor.

3. Apparatus as claimed in claim 1, wherein the perforations of the perforated bottom are irregularly distributed over it.

4. Apparatus as claimed in claim 1, comprising above the conveyor feeding the product through the freezing chamber, a second, preferably perforated conveyor extending through the freezing chamber.

5. Apparatus as claimed in claim 4, wherein the side walls at the conveyor for feeding the product through the freezing chamber extend to the second conveyor arranged above it so as to form a closed space between the conveyors.

* * * * *